United States Patent
Aizawa et al.

(10) Patent No.: US 7,191,048 B2
(45) Date of Patent: Mar. 13, 2007

(54) VEHICLE MOTION CONTROL APPARATUS

(75) Inventors: Hiroaki Aizawa, Anjo (JP); Hiroaki Niino, Toyota (JP); Minekazu Momiyama, Chiryu (JP); Hiroaki Kato, Hekinan (JP); Eiichi Ono, Toyota (JP); Yuji Muragishi, Nagoya (JP); Yoshiyuki Yasui, Nagoya (JP)

(73) Assignees: Advics Co., Ltd., Kariya (JP); Toyoda Koki Kabushiki Kaisha, Kariya (JP)

( * ) Notice: Subject to any disclaimer, the term of this patent is extended or adjusted under 35 U.S.C. 154(b) by 369 days.

(21) Appl. No.: 10/925,925

(22) Filed: Aug. 26, 2004

(65) Prior Publication Data
US 2005/0085986 A1 Apr. 21, 2005

(30) Foreign Application Priority Data
Sep. 3, 2003 (JP) ............................. 2003-311932

(51) Int. Cl.
*B60T 8/58* (2006.01)
*G06F 7/00* (2006.01)
(52) U.S. Cl. .................... 701/73; 701/41; 701/70; 701/80; 180/410; 180/201
(58) Field of Classification Search ................ 701/73, 701/80, 41, 72, 70; 180/410, 412, 415, 197, 180/201
See application file for complete search history.

(56) References Cited

U.S. PATENT DOCUMENTS
5,732,379 A * 3/1998 Eckert et al. .................. 701/83

(Continued)

FOREIGN PATENT DOCUMENTS
EP 1 357 007 A2 10/2003

(Continued)

OTHER PUBLICATIONS

Masato Abe, "Vehicle Dynamics and Control," May 31, 1994, pp. 6-7, Sankaido Co., Ltd., Japan (in Japanese) (concise explanation of relevance cited in specification at p. 1, line 17 through p. 2, line 6).

(Continued)

*Primary Examiner*—Tan Q. Nguyen
(74) *Attorney, Agent, or Firm*—Buchanan Ingersoll & Rooney PC

(57) ABSTRACT

A vehicle motion control apparatus is provided for performing a vehicle stability control on the basis of a parameter indicative of lateral margin for a tire on a road. The apparatus includes a steering control device for controlling a relationship between a steering angle and a tire angle to be varied, and a decelerating control device for controlling a vehicle speed to be decreased. The parameter indicative of lateral margin for the tire is monitored, and the steering control device and the decelerating control device are controlled on the basis of the monitored parameter. The steering control device is controlled to decrease the tire angle relative to the steering angle, when the parameter is decreased from a value of relatively large lateral margin to a value of relatively small lateral margin, which is smaller than a first threshold value, and the decelerating control device is controlled to decrease the vehicle speed in addition to the steering control by the steering control device, when the parameter is further decreased to a value of lateral margin smaller than a second threshold value, which is smaller than the first threshold value.

9 Claims, 10 Drawing Sheets

U.S. PATENT DOCUMENTS

| | | | |
|---|---|---|---|
| 6,102,151 A * | 8/2000 | Shimizu et al. | 180/446 |
| 6,155,377 A | 12/2000 | Tokunaga et al. | |
| 6,236,926 B1 * | 5/2001 | Naitou | 701/70 |
| 6,556,911 B2 * | 4/2003 | Matsuno | 701/80 |
| 2004/0019417 A1 | 1/2004 | Yasui et al. | |

FOREIGN PATENT DOCUMENTS

| | | |
|---|---|---|
| JP | 11-99956 | 4/1999 |

OTHER PUBLICATIONS

Yuji Muragishi et al., "Estimation of Grip State Based on Self Aligning Torque and Its Application to Enhance Vehicle Stability," May 22, 2003, 20035105, 4 pages, Society of Automotive Engineers of Japan, Inc., Japan (abstract included).

* cited by examiner

VEHICLE MOTION CONTROL APPARATUS

This application claims priority under 35 U.S.C. Sec. 119 to No. 2003-311932 filed in Japan on Sep. 3, 2003, the entire content of which is herein incorporated by reference.

BACKGROUND OF THE INVENTION

1. Field of the Invention

The present invention relates to a vehicle motion control apparatus, particularly relates to an apparatus for performing a vehicle stability control in response to state of a tire on a road.

2. Description of the Related Arts

In general, when a vehicle is moving with a motion in a lateral direction or yawing motion, a rotating plane of a wheel is not directed to a moving direction of a vehicle on a road, so that a so-called lateral slip is caused. As a parameter or factor indicative of that state of the wheel, a slip angle, or wheel slip angle is employed. According to a book entitled "Vehicle Dynamics and Control" written by Mr. Masato Abe in Japanese, and published by Sankaido Co., Ltd., on May 31, 1994, it is defined that an angle between a moving direction of a wheel and a rotating plane of the wheel (a direction to which the wheel is oriented) is named as "slip angle". In that book, it is described that in the case where the wheel slip is being caused, "lateral force" is produced in a direction perpendicular to the rotating plane of the wheel, in addition to driving force, braking force or the like, and it is further described that a component of the lateral force in a direction perpendicular to the moving direction of the wheel is named as "cornering force".

With respect to the lateral force as described above, a parameter or factor called as a lateral force utilization ratio, or lateral G utilization ratio has been used in a variable gear ratio steering apparatus for a vehicle, which is disclosed in Japanese Patent Laid-open Publication No. 11-99956 (corresponding to U.S. Pat. No. 6,155,377), and which was aimed to prevent a steered wheel from being over-steered. According to the apparatus as disclosed in that Japanese Patent Laid-open Publication, a road coefficient of friction $\mu$ is estimated at the outset, to obtain the lateral force utilization ratio. The lower the road coefficient of friction $\mu$ is, the more a cornering power Cp (value of the lateral force per the slip angle of one degree) of a tire is decreased, whereby a reaction force of a rack shaft applied from a road with a certain steered angle is decreased according to the road coefficient of friction $\mu$. Therefore, it is described that the road coefficient of friction $\mu$ can be estimated by measuring a steered angle of a front wheel and an actual reaction force of the rack shaft, and comparing the actual reaction force of the rack shaft for the steered angle with a reference reaction force of the rack shaft provided in advance as an inside model. Furthermore, a maximal lateral force is obtained by providing an equivalent friction circle on the basis of the road coefficient of friction $\mu$, and subtracting a part of the frictional force caused by a longitudinal force, and its ratio to the present lateral force is identified as the lateral force utilization ratio ("side force utilization ratio" in the corresponding U.S. Patent). It is also described that, with a lateral G sensor installed, the lateral G utilization ratio can be provided on the basis of the lateral G detected by the lateral G sensor.

In contrast, a parameter reflecting a property of a wheel as a pneumatic tire is explained in prior papers entitled "Estimation of Grip State Based on Self Aligning Torque and Its Application to Enhance Vehicle Stability", written in Japanese by Mr. Yuji Muragishi et al. including five inventors of the present invention, and distributed at Spring seminar held by Society of Automotive Engineers of Japan, Inc., on May 22, 2003. That is, such a parameter that indicates a margin for the tire with its cornering force being reached to its limit, in other words, the parameter that indicates the margin up to the limit how much of maximal force can be produced by the tire, has been defined as a lateral grip margin. And, it is explained that the lateral grip margin can be estimated on the basis of a self aligning torque and a reference self aligning torque, calculation of which are explained in detail in the prior papers, and therefore omitted herein. Furthermore, in the prior papers, a steering and braking control using the estimated parameter has been proposed, and a result evaluated the improvement of performance in the vehicle stability control has been disclosed. It is stated that the vehicle stability control can be initiated from such a state that the tire is getting close to its limit zone with a margin being still remained. As an example applied to a steering system, there is disclosed an example with the estimated result of the lateral grip margin applied to a variable control of overall steering gear ratio. And, as an example applied to a braking system, there is disclosed an example with the estimated result of the lateral grip margin applied to a decelerating control. And, it is described that a future issue to be considered is a total control for combining the steering system and the braking system.

With respect to the property of wheel as the pneumatic tire discussed in the aforementioned prior papers, it is also described in the above-described book such that among various wheels such as a wheel with a pneumatic rubber tire, wheel with a rigid rubber tire and an iron wheel, the wheel with the pneumatic rubber tire is capable of producing the maximum force, with reference to the relationship between the slip angle and the cornering force for each wheel. Then, the wheel with the pneumatic rubber tire has been simply referred to as "tire", and explanations have been made about the force applied to the tire with the lateral slip being caused, and the property of the force, and further about the self aligning torque as described above.

The above-described lateral grip margin is clearly distinguished from the lateral force utilization ratio, or lateral G utilization ratio as described in the Japanese Patent Laid-open Publication No. 11-99956. According to the apparatus as disclosed in that Publication, a road coefficient of friction $\mu$ is estimated, to provide the maximum lateral force that could be produced on the road. This road coefficient of friction $\mu$ is estimated on the basis of a reliability of the cornering power Cp (value of the lateral force per the slip angle of one degree) on the road coefficient of friction $\mu$. However, the cornering power Cp relies not only on the road coefficient of friction $\mu$, but also a configuration of the area of the road contacting the tire (its contacting length and width to the road), and elasticity of the tread rubber. For example, in the case where water exists on the tread surface, or the case where the elasticity of the tread rubber has been changed due to wear of the tire or its temperature change, the cornering power Cp will vary, even if the road coefficient of friction $\mu$ is constant. In the Japanese Patent Laid-open Publication No. 11-99956, however, nothing has been considered about the characteristic of the tire which constitutes the wheel. Therefore, the lateral force utilization ratio or lateral G utilization ratio as described in the Japanese Patent Laid-open Publication is essentially different from the parameter or factor indicative of lateral grip margin (hereinafter, referred to as grip factor) as described in the aforementioned prior papers, but can be included in the parameter indicative of lateral margin for the tire which can be provided for use in the vehicle motion control apparatus according to the present invention.

With respect to parameters for performing the steering control for preventing the vehicle behavior from being changed, in addition to the lateral force utilization ratio as described above, the parameters such as the one provided on the basis of the slip angle of the wheel can be used. According to the present application, therefore, those may be served as the parameter indicative of lateral margin for the tire, as well as the grip factor as explained above, provided that those parameters can be provided for the decelerating control, while there may be differences in effects among those parameters. The decelerating control is such a control that decreases vehicle speed irrespective of operation of a vehicle driver, and may be achieved by a braking pressure control device, a throttle control device or so-called fuel injection control device for use in an engine, a shift control device for controlling a shift gear ratio or the like, thereby to decrease the vehicle speed. In the case where the steering control is performed to control the tire angle (steered wheel angle) thereby to achieve the vehicle stability control, on the basis of the above-described parameter indicative of lateral margin for the tire, it will not deteriorate a feeling to a vehicle driver so much, because it will not cause a large change in vehicle behavior, but its effect will be rather small. On the contrary, in the case where the decelerating control such as the braking control is performed to decrease the vehicle speed on the basis of the above-described parameter indicative of lateral margin for the tire, thereby to achieve the vehicle stability control, its effect for the vehicle stability control will be large, but it is likely that a different feeling due to the change in vehicle behavior will be given to the vehicle driver. Therefore, it is important to have the steering control and the decelerating control be combined appropriately in view of their advantages and disadvantages, thereby to achieve the vehicle stability control effectively, with the different feeling being caused as small as possible.

SUMMARY OF THE INVENTION

Accordingly, it is an object of the present invention to provide a vehicle motion control apparatus capable of performing a steering control and a decelerating control appropriately on the basis of a parameter indicative of lateral margin for a tire on a road, thereby to achieve a vehicle stability control effectively.

In accomplishing the above object, the vehicle motion control apparatus is provided for performing a vehicle stability control on the basis of a parameter indicative of lateral margin for a tire on a road. The apparatus includes a steering control device for controlling a relationship between a steering angle and a tire angle to be varied, and a decelerating control device for controlling a vehicle speed to be decreased. A monitor is provided for monitoring the parameter indicative of lateral margin for the tire, and a motion control device is provided for controlling the steering control device and the decelerating control device on the basis of the parameter monitored by the monitor. The motion control device is adapted to control the steering control device to decrease the tire angle relative to the steering angle, when the parameter is decreased from a value of relatively large lateral margin to a value of relatively small lateral margin, which is smaller than a first threshold value, and adapted to control the decelerating control device to decrease the vehicle speed in addition to the steering control by the steering control device, when the parameter is further decreased to a value of lateral margin smaller than a second threshold value, which is smaller than the first threshold value.

In the case where the parameter indicative of lateral margin for the tire on the road is decreased, therefore, firstly the steering control is performed without unnecessary tire angle being provided, so as to enable stable operations of cornering and changing lanes to be achieved, and thereafter the decelerating control is performed, when the parameter indicative of lateral margin for the tire is decreased further, even if the steering control was performed. Consequently, the stable operations of cornering and changing lanes can be achieved, with the change in vehicle behavior due to the decelerating control being caused as small as possible.

The motion control device may be adapted to control the decelerating control device to decrease the vehicle speed, in the case where the parameter indicative of lateral margin for the tire does not tend to be recovered, when a predetermined time has elapsed after the motion control device controlled the steering control device to decrease the tire angle relative to the steering angle, whereby it is determined that the parameter has come to be decreased to a value of lateral margin smaller than the second threshold value. Consequently, the decelerating control is performed in the case where the parameter indicative of lateral margin for the tire does not tend to be recovered, when the predetermined time has elapsed after the steering control, even if the steering control was performed.

Or, the motion control device may be adapted to control the decelerating control device to decrease the vehicle speed, in the case where the relationship between the steering angle and the tire angle has provided a difference larger than a predetermined difference, after the motion control device controlled the steering control device to decrease the tire angle relative to the steering angle, whereby it is determined that the parameter has come to be decreased to a value of lateral margin smaller than the second threshold value. Consequently, the decelerating control is performed in the case where the difference between the steering angle and the tire angle has exceeded the predetermined difference, even if the steering control was performed.

Each apparatus may further include a steering monitor for monitoring an operating state of the steering control device. Then, the motion control device may be adapted to modify the second threshold value to be larger in margin, when it is determined on the basis of the result monitored by the steering monitor that the steering control device is inoperative. Consequently, disadvantages caused when the steering control device is inoperative can be minimized.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
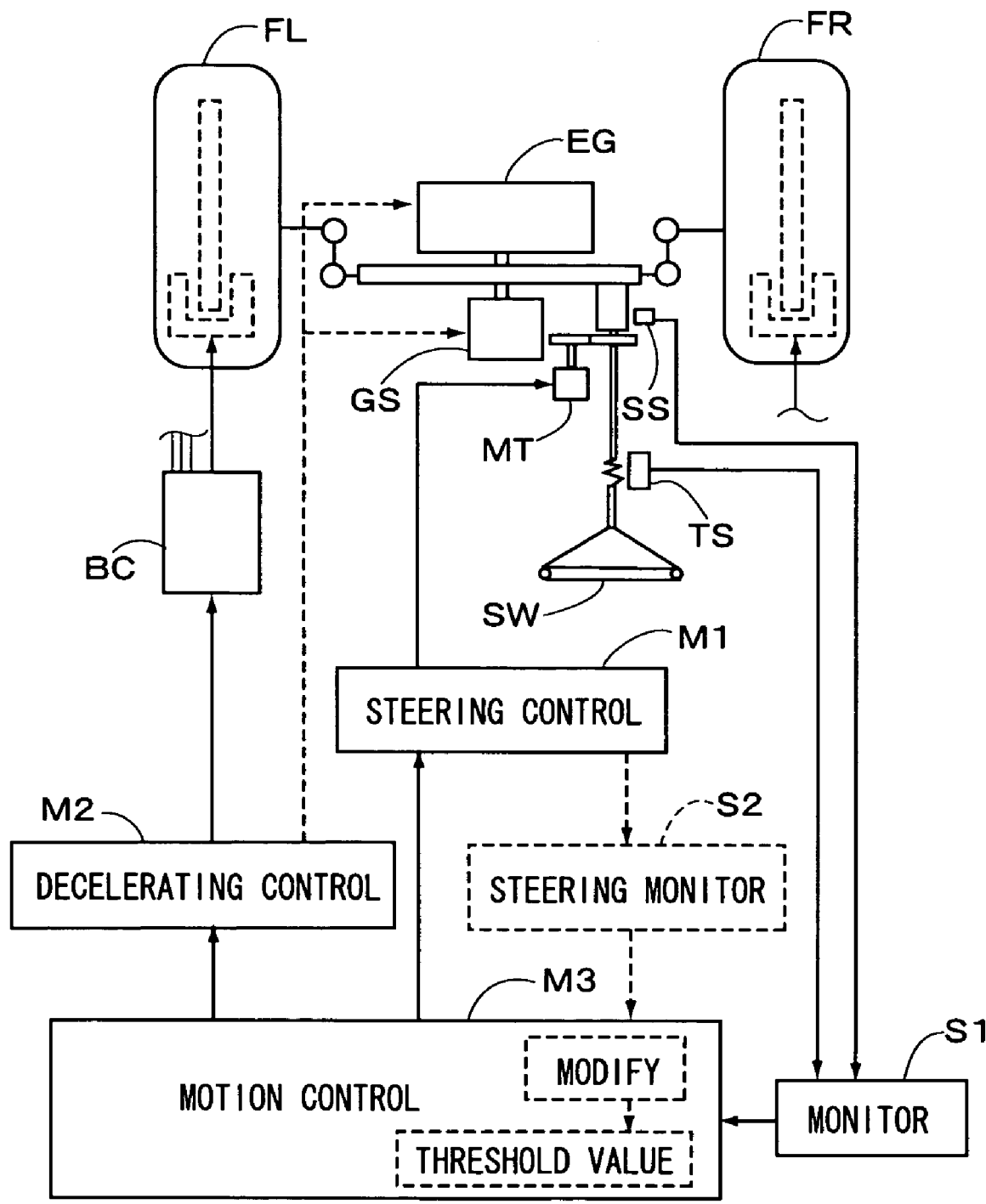
FIG. 1 is a schematic block diagram showing a vehicle motion control apparatus according to the present invention.

Referring to FIG. 1, there is schematically illustrated a block diagram of a vehicle motion control apparatus according to the present invention. The apparatus includes a steering control device M1 for controlling a relationship between a steering angle and a tire angle to be varied, with respect to front wheels FL and FR, and a decelerating control device M2 for controlling a vehicle speed to be decreased. The decelerating control according to the latter device means such a control as decreasing the vehicle speed irrespective of operation of a vehicle driver. An example of the decelerating control device M2 is a hydraulic braking pressure control device BC. As indicated by broken lines in FIG. 1, however, the vehicle speed may be decreased by controlling a throttle opening of an engine EG, or controlling a shift control device GS to shift down a gear ratio thereof.

Then, a parameter indicative of lateral margin for a tire (FL or FR) is monitored by a monitor S1, and the steering control device M1 and decelerating control device M2 are controlled by a motion control device M3 on the basis of the monitored parameter, as follows: That is, the steering control device M1 is so controlled as to decrease the tire angle relative to the steering angle, when the parameter indicative of lateral margin for the tire (FL or FR) is decreased from a value of relatively large lateral margin to a value of relatively small lateral margin that is smaller than a first threshold value. And, the decelerating control device M2 is so controlled as to decrease the vehicle speed, in addition to the steering control by the steering control device M1, when the parameter is further decreased to a value of lateral margin smaller than a second threshold value, which is smaller than the first threshold value.

According to the vehicle motion control apparatus as described above, therefore, when the parameter indicative of lateral margin for the tire on the road is decreased, firstly the steering control is performed without unnecessary tire angle being provided, so as to enable stable operations of cornering and changing lanes to be achieved, and thereafter the decelerating control is performed, when the parameter indicative of lateral margin for the tire is decreased further, even if the steering control was performed. Consequently, the stable operations of cornering and changing lanes can be achieved, with the change in vehicle behavior due to the decelerating control being caused as small as possible.

In the case where the parameter indicative of lateral margin for the tire does not tend to be recovered, when a predetermined time has elapsed after the steering control device M1 was controlled to decrease the tire angle, it is determined by the motion control device M3 that the parameter has come to be decreased to a value of lateral margin smaller than the second threshold value, the decelerating control device M2 is controlled by the motion control device M3 to decrease the vehicle speed. In other words, when the parameter indicative of lateral margin for the tire on the road is decreased, firstly the steering control is performed without unnecessary tire angle being provided, and thereafter the decelerating control is performed in the case where the parameter indicative of lateral margin for the tire does not tend to be recovered, when the predetermined time has elapsed after the steering control, even if the steering control was performed.

And, in the case where the relationship between the steering angle and the tire angle has provided a difference larger than a predetermined difference, after the steering control device M1 was controlled to decrease the tire angle relative to the steering angle, it is determined that the parameter has come to be decreased to a value of lateral margin smaller than the second threshold value. Then, the decelerating control device M2 is controlled by the motion control device M3 to decrease the vehicle speed. In other words, when the parameter indicative of lateral margin for the tire on the road is decreased, firstly the steering control is performed without unnecessary tire angle being provided, and thereafter the decelerating control is performed in the case where the difference between the steering angle and the tire angle has exceeded the predetermined difference, even if the steering control was performed, i.e., in such a condition that the vehicle is hardly turned.

Furthermore, as shown by a broken line in FIG. 1, a steering monitor S2 may be provided for monitoring an operating state of the steering control device M1. According to the motion control device M3, therefore, the second threshold value may be modified to be larger in margin, when it is determined on the basis of the result monitored by the steering monitor S2 that the steering control device M1 is inoperative. Or, in the case where it is determined that the steering control device M1 is inoperative, on the basis of the result monitored by the steering monitor S2, when the parameter has come to be decreased from a value of lateral margin larger than a third threshold value, which is larger than the second threshold value, to a value of lateral margin smaller than the third threshold value, the decelerating control device M2 may be controlled by the motion control device M3 to decrease the vehicle speed. Consequently, disadvantages caused when the steering control device M1 is inoperative can be minimized.

Figure 2:
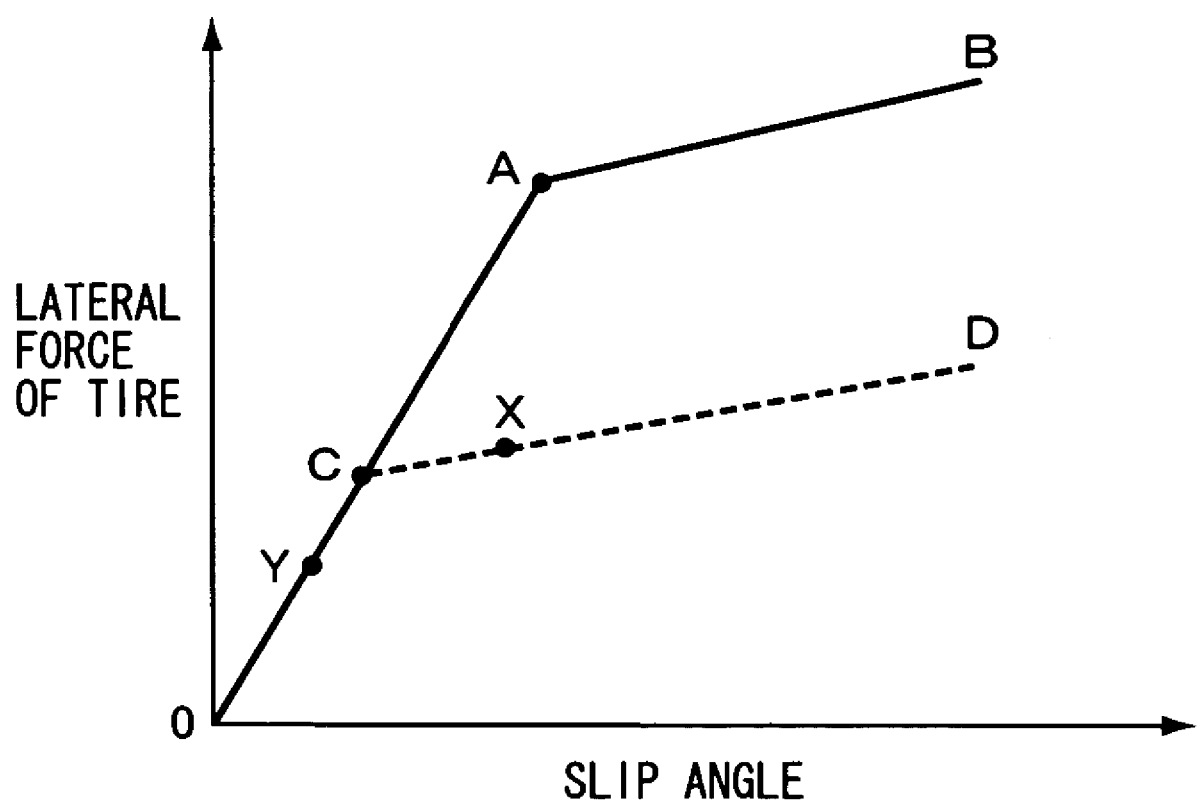
FIG. 2 is a diagram showing a relationship between lateral force and slip angle of a tire on a road, comparing with a property of a prior apparatus and a property of the present invention.

According to the present embodiment, the grip factor (i.e., parameter indicative of lateral grip margin as described in the aforementioned prior papers) has been employed as the aforementioned parameter indicative of lateral margin for a tire on a road surface. Therefore, the vehicle behavior can be estimated before the tire reaches its limit, as explained hereinafter with reference to FIG. 2 showing a property of lateral force applied to a tire. In general, lateral force to a tire (wheel) is increased linearly in response to increase of the slip angle of the wheel, and saturated when the friction between the tire and road surface reaches a frictional limit. In the case where the road coefficient of friction is high, for example, the lateral force property will be the one as indicated by a solid line O-A-B in FIG. 2. And, in the case where the road coefficient of friction is decreased, the property will be the one as indicated by the solid line and broken line O-C-D in FIG. 2. In this case, according to such an apparatus that the vehicle stability control is achieved on the basis of state variable indicative of vehicle behavior, such as lateral acceleration or yaw rate, it is possible to determine the upper limit of the road coefficient of friction on the basis of the vehicle behavior in such a critical state as indicated by a position "X" in FIG. 2, for example. In the case where it is in such a state as indicated by a position "Y" in FIG. 2, however, it can not be determined whether the position "Y" is a part of the property of O-A-B (for high coefficient of friction), or the position "Y" is a part of the property of O-C-D (for low coefficient of friction). In other words, it can not be determined, only by the state variable indicative of vehicle behavior as described above, whether there is any margin up to the upper limit for the coefficient of friction of the wheel against the road surface, or the vehicle is getting close to a zone with unstable state. On the contrary, the grip factor is the parameter indicative of lateral grip margin up to the limit, so as to indicate how much of frictional force the tire is producing, out of the maximal force that the tire is capable of producing. As the grip factor can be calculated as described in the aforementioned prior papers, it can determine in which property the position "Y" as shown in FIG. 2 is included. By means of the grip factor, therefore, the vehicle stability control can be achieved appropriately from a zone with normal state, i.e., before the vehicle enters into a zone with the upper limit for the coefficient of friction.

According to the aforementioned prior papers, the grip factor is estimated by providing a reference self aligning torque for the self aligning torque varied in response to a wheel slip angle. Instead of the wheel slip angle, lateral force or side force may be used. In this case, obtained is a gradient of the self aligning torque varied in response to the side force in the vicinity of a position where the side force is zero, and provided is a reference self aligning torque to the side force. Then, on the basis of the ratio between the reference self aligning torque and the actual aligning torque, the grip factor can be obtained. Furthermore, the grip factor may be obtained, taking into consideration both of the grip factor $\epsilon SA$ obtained in response to the wheel slip angle and the grip factor $\epsilon CF$ obtained in response to the side force. In this case, a grip factor $\epsilon$ may be obtained according to the equation of; [$\epsilon = K1 \cdot \epsilon SA + K2 \cdot \epsilon CF$], where $K1$ and $K2$ are weighting coefficients.

Figure 3:
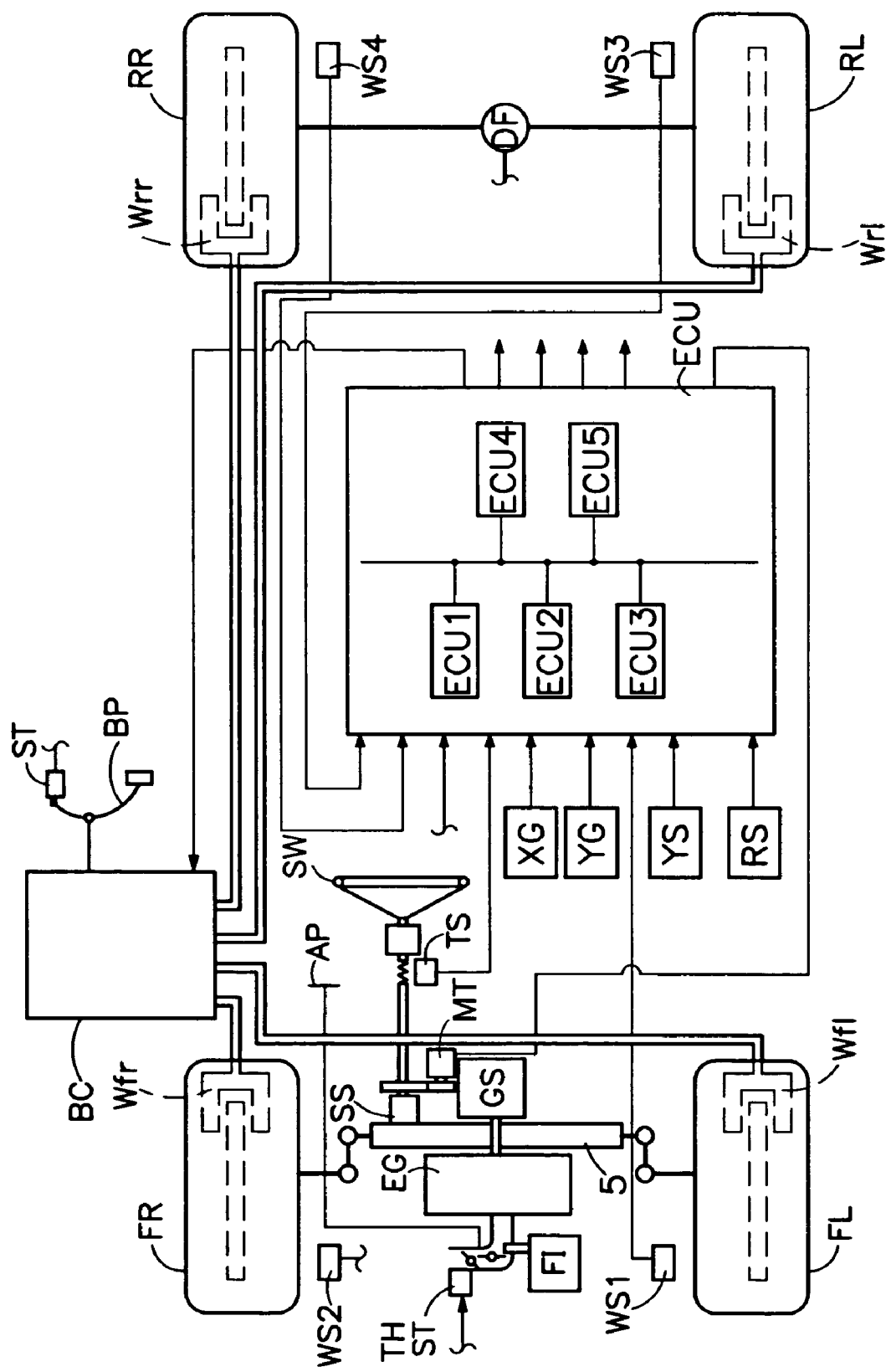
FIG. 3 is a schematic block diagram showing an overall structure of a vehicle motion control apparatus according to the present invention.

FIG. 3 illustrates an overall structure of the vehicle including an embodiment of the vehicle motion control apparatus as described above, wherein the steering system includes an electric power steering system EPS and an active front wheel steering system AFS. The electric power steering system EPS has already been on the market, wherein the steering torque Tstr applied to a steering shaft with the steering wheel SW operated by the vehicle driver, is detected by the steering torque sensor TS, and the EPS motor (electric motor) MT is controlled in response to the detected steering torque Tstr, to steer the front wheels FL and FR through a decelerating gear and a rack and pinion, so as to assist the steering operation of the vehicle driver.

In the active front wheel steering system AFS, the steered wheel angle (tire angle) can be controlled freely in response to operation of the steering wheel SW by the vehicle driver, by means of an active front wheel steering mechanism (not shown) provided with a planetary gear train and AFS motor (electric motor), not shown. According to the steering system AFS, an active steering control for increasing or decreasing the steered wheel angle (tire angle) to the steering operation angle (steering angle, or handle angle) can be achieved by controlling the steering gear ratio of the steering operation angle to the steered wheel angle.

As shown in FIG. 3, an engine EG in the present embodiment is an internal combustion engine which is provided with a fuel injection apparatus FI and a throttle control apparatus TH, which is adapted to control a throttle opening in response to operation of an accelerator pedal AP. In response to output signals of an electronic controller ECU, the throttle control apparatus TH is actuated to control the throttle opening, and the fuel injection apparatus FI is actuated to control the fuel injected into the engine EG. According to the present embodiment, the engine EG is operatively connected with the rear wheels RL, RR through a transmission GS and differential gear DF to provide a so-called rear-drive system, but the present embodiment is not limited to the rear-drive system.

Next, with respect to a braking system according to the present embodiment, wheel brake cylinders Wfl, Wfr, Wrl, Wrr are operatively associated with the wheels FL, FR, RL, RR of the vehicle, respectively, and which is fluidly connected to the hydraulic braking pressure control device BC. This device BC includes a plurality of solenoid valves and an automatic hydraulic pressure generating source, e.g., pressure pump or the like, to provide a hydraulic pressure circuit which can be pressurized automatically. As the device BC is the same as an ordinary device, and the present embodiment is not characterized in a specific hydraulic braking pressure control, a drawing and explanation thereof are omitted herein. In FIG. 3, the wheel FL designates the wheel at the front left side as viewed from the position of a driver's seat, the wheel FR designates the wheel at the front right side, the wheel RL designates the wheel at the rear left side, and the wheel RR designates the wheel at the rear right side.

As shown in FIG. 3, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a stop switch ST which turns on when the brake pedal BP is depressed, and turns off when the brake pedal BP is released, a steering angle sensor SS for detecting a steering angle $\theta h$ of the front wheels FL and FR, a longitudinal acceleration sensor XG for detecting a vehicle longitudinal acceleration Gx, a lateral acceleration sensor YG for detecting a vehicle lateral acceleration Gy, a yaw rate sensor YS for detecting a yaw rate $\gamma$ of the vehicle, steering torque sensor TS, rotational angle sensor RS for detecting a rotational (turning) angle of the EPS motor MT, and so on. These are electrically connected to the electronic controller ECU.

Figure 4:
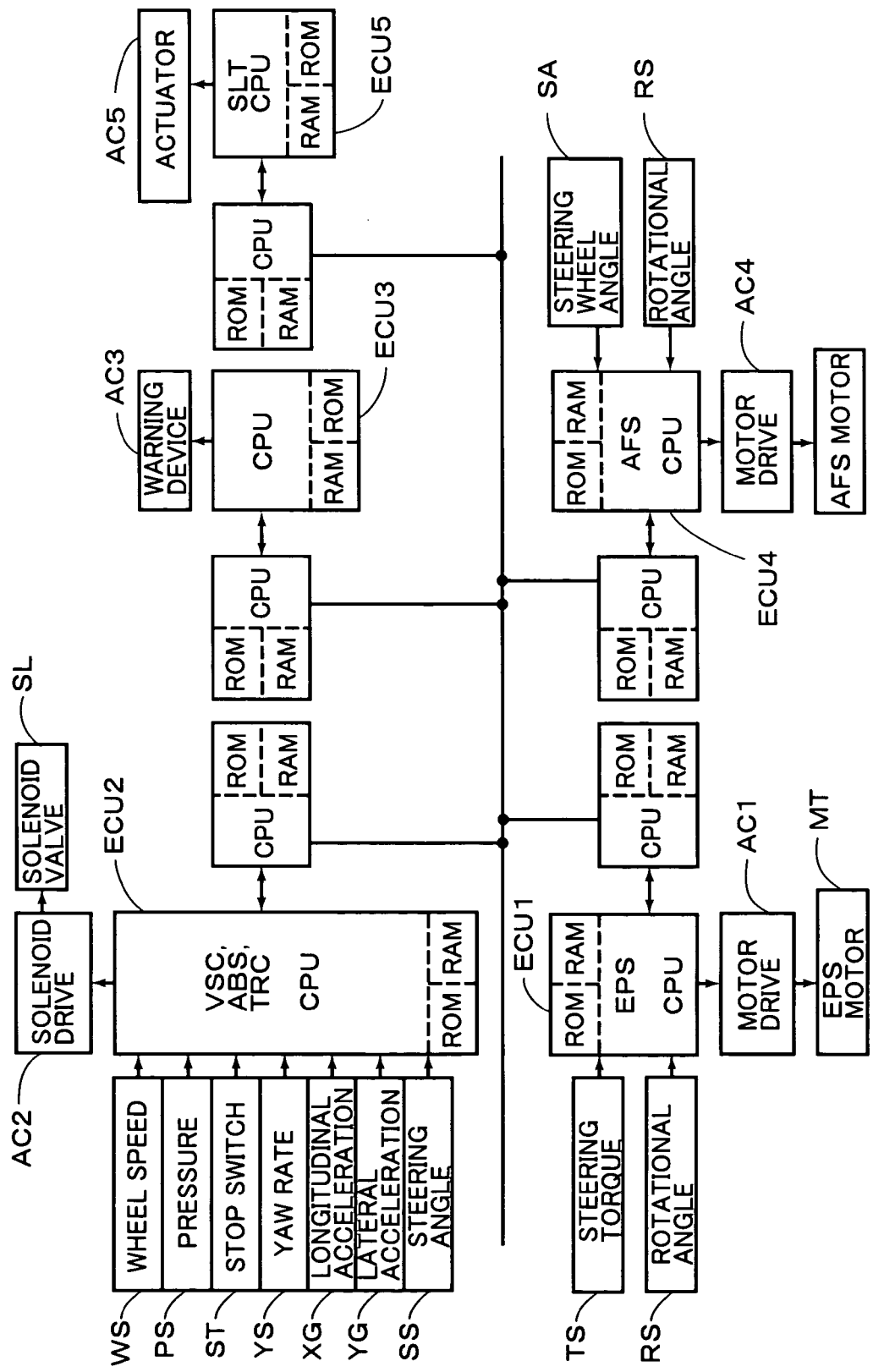
FIG. 4 is a block diagram showing an embodiment of a system constituting a vehicle motion control apparatus according to the present invention.

FIG. 4 shows an overall system of the present invention, wherein the steering control system EPS, active front wheel steering system AFS, braking control system (ABS, TRC, VSC), throttle control system SLT and warning system are connected with each other through the communication bus, so that each system may hold each information commonly. The steering control system includes a steering control unit ECU1 which is provided with CPU, ROM and RAM for the electric steering control (EPS), and to which the steering torque sensor TS and rotational angle sensor RS are connected, and also the EPS motor MT is connected through a motor drive circuit AC1. The braking control system is adapted to perform the anti-skid control (ABS), traction control (TRC), and vehicle stability control (VSC), and includes a braking control unit ECU2 which is provided with CPU, ROM and RAM for the braking control, and to which the wheel speed sensors WS, hydraulic pressure sensors PS, stop switch ST, yaw rate sensor YS, longitudinal acceleration sensor XG, lateral acceleration sensor YG and steering angle sensor SS are connected, and also solenoid valves SL are connected through a solenoid drive circuit AC2.

The warning system is adapted to output a warning signal when the grip factor is less than a predetermined value, and includes a warning control unit ECU3 which is provided with CPU, ROM and RAM for the warning control, and to which a warning device AC3 for providing the warning information through an indicator or audio system or the like. The active front wheel steering system AFS includes an active steering control unit ECU4 which is provided with CPU, ROM and RAM for the active front wheel steering control, and to which a steering operation angle sensor SA and a rotational angle sensor RS are connected, and the AFS motor is connected through a motor drive circuit AC4. Likewise, the throttle control (SLT) system includes a throttle control unit ECU5 which is provided with CPU, ROM and RAM for the throttle control, and to which a throttle control actuator AC5 is connected. Those control units ECU1–ECU5 are connected to the communication bus through a communication unit provided with CPU, ROM and RAM for the communication, respectively. Accordingly, the information required for each control system can be transmitted by other control systems.

Figure 5:
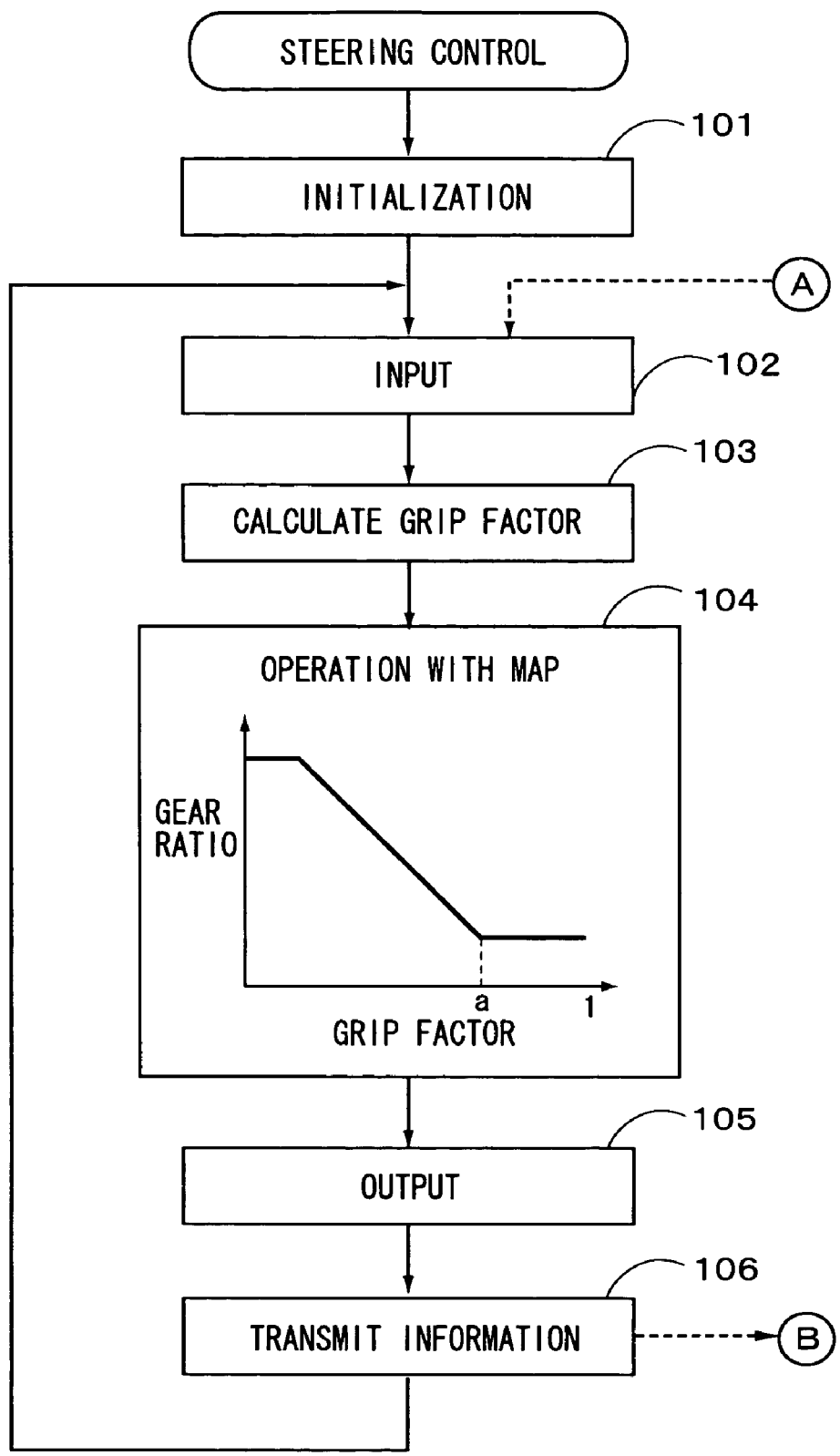
FIG. 5 is a flowchart showing operation of a steering control according to an embodiment of the present invention.
Figure 6:
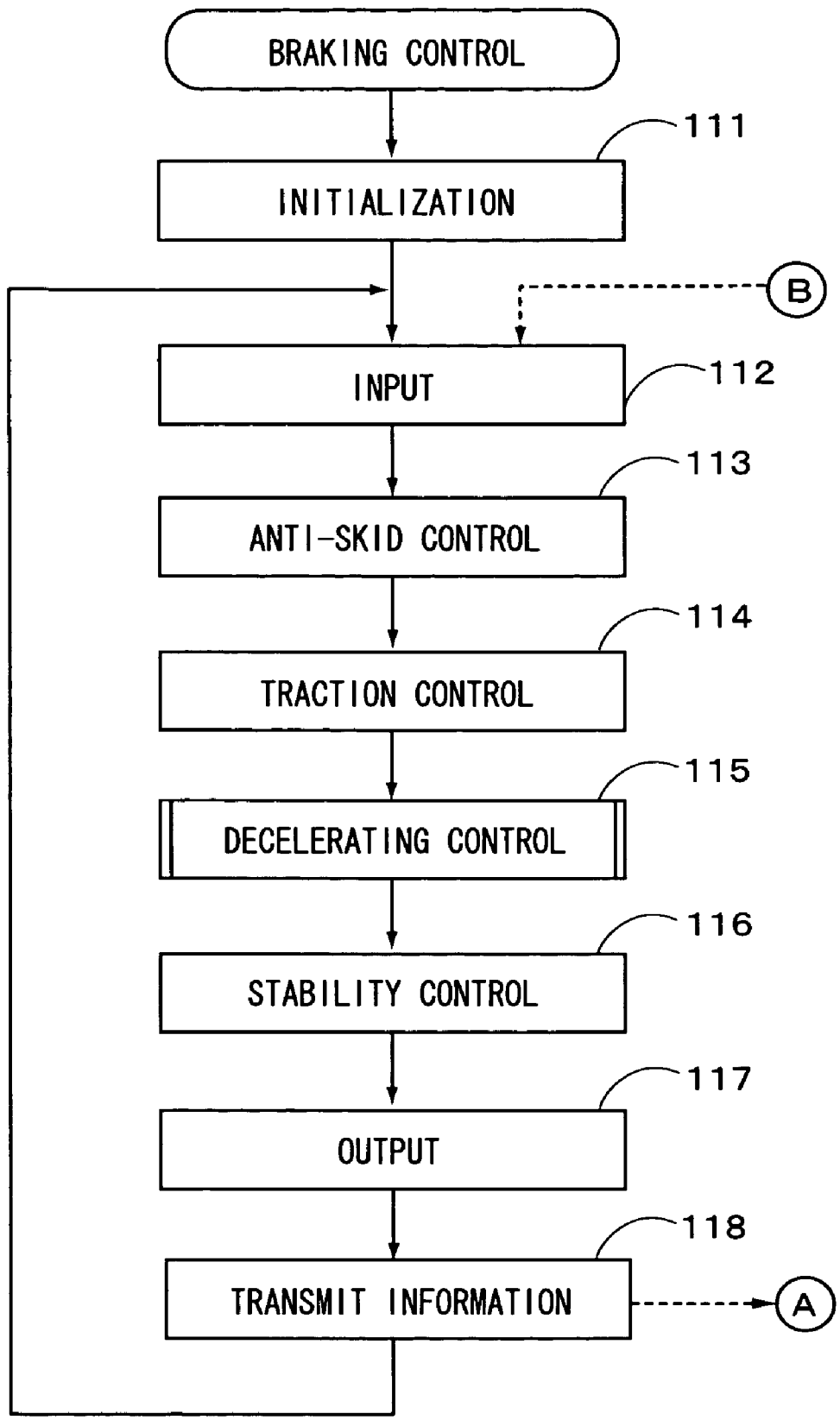
FIG. 6 is a flowchart showing operation of a braking control according to an embodiment of the present invention.

According to the vehicle motion control apparatus as constituted above, a process achieved by the steering control device M1 for controlling a relationship between the steering angle and the tire angle to be varied, and another process achieved by the decelerating control device M2 for controlling the vehicle speed to be decreased, through a braking control, will be explained according to a flow chart as shown in FIGS. 5 and 6. At the outset, with respect to the steering control, the program provides for initialization of the system at Step 101, and the sensor signals are input and steered wheel angle, vehicle speed, longitudinal acceleration, lateral acceleration, yaw rate or the like are read at Step 102, and various data (A) calculated by the braking control unit ECU2 are read as well, through the communication signals. Then, the program proceeds to Step 103 where the grip factor indicative of the lateral margin for the tire is calculated, as described in the aforementioned prior papers, so that its explanation is omitted herein. Next, at Step 104, in response to the grip factor, provided is a gear ratio of a ratio between the steering wheel angle (steering angle) to the steered wheel angle (tire angle). In practice, on the basis of a map as shown in Step 104 in FIG. 5, which illustrates the gear ratio varied according to variation of the grip factor, the gear ratio is set to become large so that the steering operation is hardly made, when the grip factor has come to be smaller than a predetermined value (a) as shown in FIG. 5, which provides the first threshold value. Then, at Step 105, output operation is made so that the control is performed according to the gear ratio set as described above. Furthermore, the information transmitting operation is made at Step 106, so that various information (B) including the grip factor is transmitted to Step 112 in FIG. 6.

With respect to the braking control as shown in FIG. 6, after the initialization of the system is performed at Step 111, the various sensor signals are input at Step 112 so that the vehicle speed, longitudinal acceleration, lateral acceleration, yaw rate or the like are read, and the various information (B) calculated by the steering control unit ECU1 are read as well, through communication signals. Then, the program proceeds to Steps 113 and 114, where the parameters are provided for the anti-skid control (ABS) and traction control (TRC), which are the same as those performed in general, so that the explanation about those controls is omitted herein.

At Step 115, the decelerating control is performed according to the grip factor. In practice, on the basis of a map as shown in Step 122 in FIG. 7, which illustrates a desired deceleration varied according to variation of the grip factor, the desired deceleration is set to become large so that the vehicle speed is largely decreased, according to decrease of the grip factor. In this case, if the steering control can be achieved (i.e., operative), the desired deceleration is set as indicated by the solid line, when the grip factor has come to be smaller than a predetermined value (b), which is smaller than the predetermined value (a), and which provides the second threshold value. On the contrary, if the steering control can not be achieved (i.e., inoperative), the desired deceleration is set as indicated by the broken line, when the grip factor has come to be smaller than a predetermined value (c), which is larger than the predetermined value (b), and which provides the third threshold value. In other words, if the steering control is inoperative, when the grip factor tends to be decreased, the decelerating control begins earlier. The predetermined value (c) is not necessarily set to be different from the predetermined value (a), but may be set to be equal to the latter.

Figure 7:
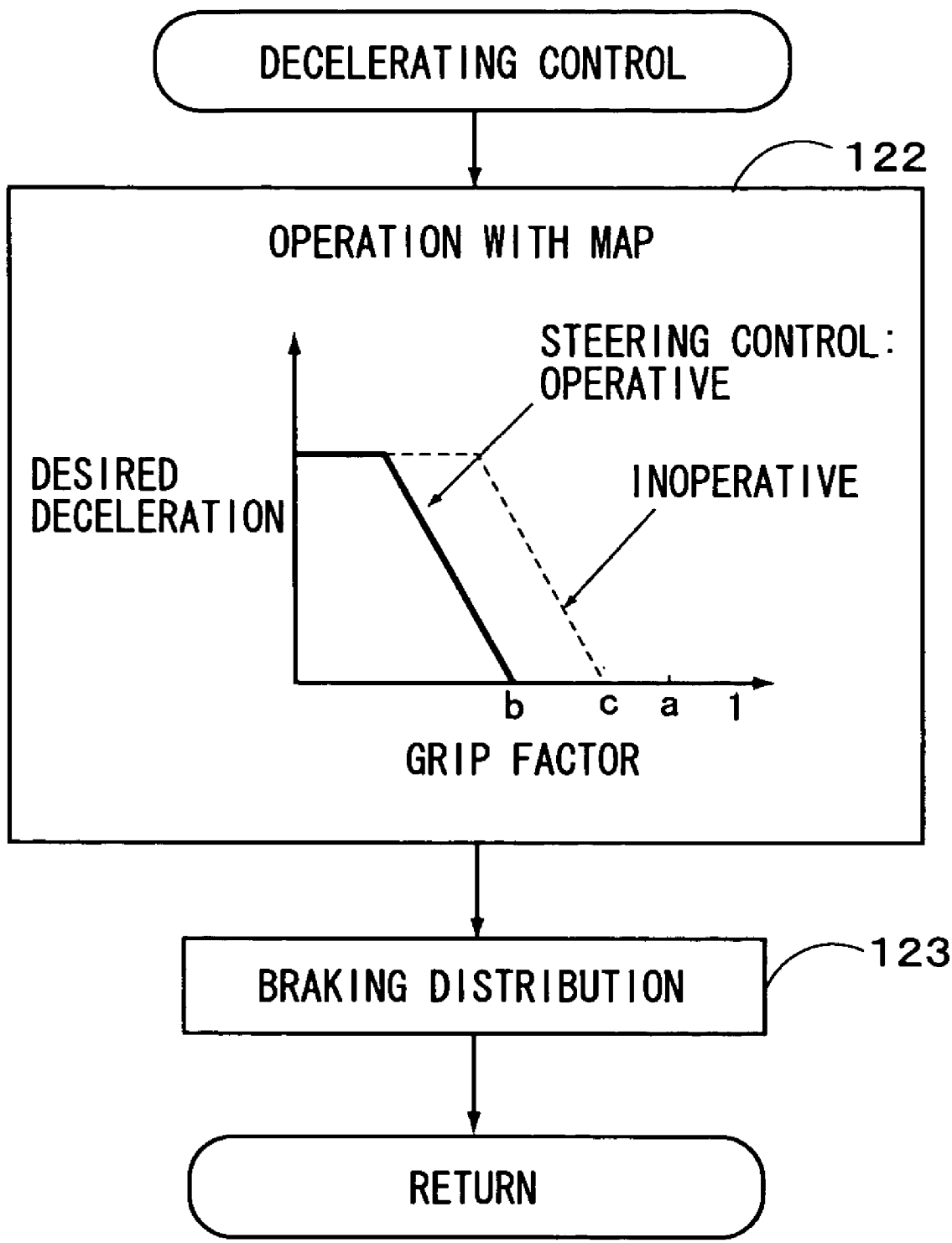
FIG. 7 is a flowchart showing operation of a decelerating control to be performed in response to a grip factor according to an embodiment of the present invention.

Then, at Step 123 in FIG. 7, the braking force (controlled amount) for each wheel is set to provide the desired deceleration as described above, and the program returns to Step 116 in FIG. 6, where the parameters are provided for the vehicle stability control (VSC), which is the same as the known one so that the explanation is omitted herein. Consequently, output process is made at Step 117 to perform various controls, and the information transmitting process is made at Step 118, so that various information (A) is transmitted to Step 102 in FIG. 5.

Figure 8:
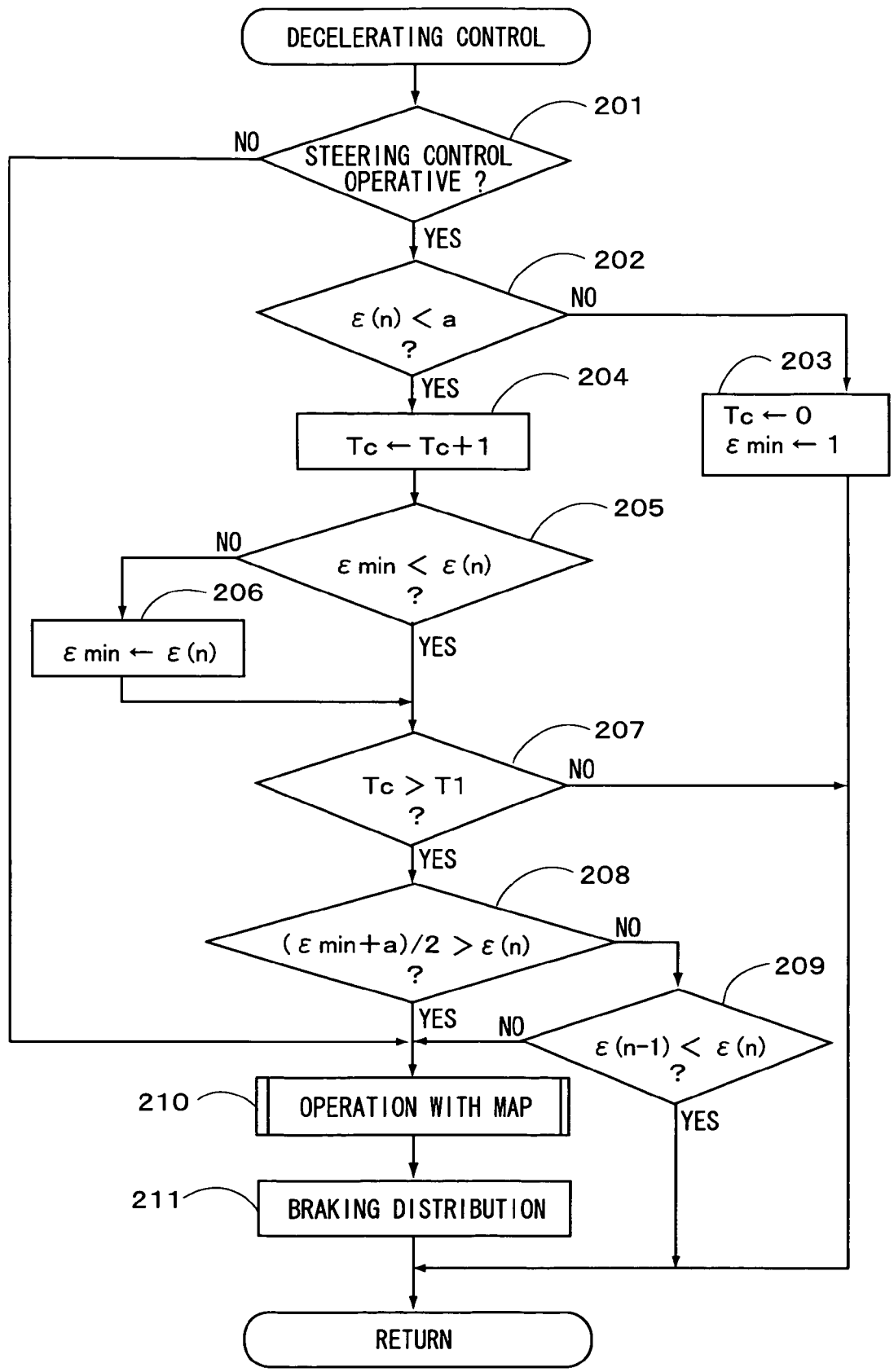
FIG. 8 is a flowchart showing operation of a decelerating control to be performed in response to a grip factor according to another embodiment of the present invention.
Figure 9:
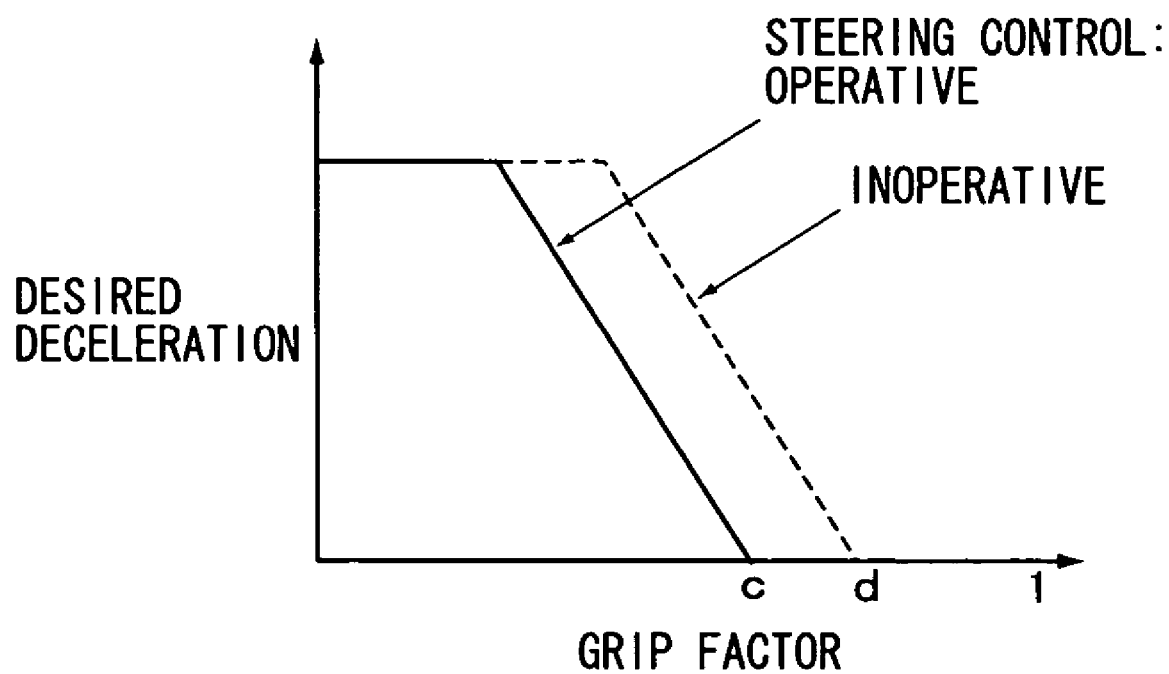
FIG. 9 is a diagram showing a map provided for a decelerating control to be performed in response to a grip factor as shown in FIG. 8.

FIG. 8 discloses another embodiment of the decelerating control to be performed according to the grip factor at Step 115 in FIG. 6, wherein the steering control to be performed is the same as the one as shown in FIG. 5. At Step 201, it is determined whether the steering control can be performed or not, on the basis of the information (B) transmitted by the steering control unit ECU1. If the steering control can be performed (i.e., operative), the program proceeds to Step 202, otherwise (i.e., inoperative), the program proceeds to Step 210, where the decelerating control is performed according to the grip factor as shown in FIG. 9. At Step 202, it is determined whether the grip factor is the value for performing the steering control. That is, in the case where the present grip factor $\epsilon(n)$ is equal to or larger than the predetermined value (a), and therefore the steering control has not been performed, the program proceeds to Step 203 where a counter Tc with a value indicative of a time elapsed from beginning of the steering control and minimal value $\epsilon$min are initialized to provide "0" and "1", respectively, and returns to the main routine as shown in FIG. 6. In the case where it is determined at Step 202 that the present grip factor $\epsilon(n)$ is smaller than the predetermined value (a), the counter Tc is incremented (+1) at Step 204, and then the present grip factor $\epsilon(n)$ is compared with the minimal value $\epsilon$min (the minimum grip factor in the memorized grip factors) at Step 205. As a result, when it is determined that the present grip factor $\epsilon(n)$ is equal to or smaller than the minimal value $\epsilon$min, the present grip factor $\epsilon(n)$ is memorized as the minimal value $\epsilon$min at Step 206, and the program further proceeds to Step 207.

When it is determined at Step 205 that the present grip factor ε(n) is larger than the minimal value εmin, the program proceeds to Step 207, where the time elapsed from beginning of the steering control (the value of counter Tc) is compared with the predetermined time (predetermined value Ti which provides the second threshold value). If it is determined that the predetermined time (T1) has not been elapsed, the program returns to the main routine as shown in FIG. 6. If the predetermined time (T1) has been elapsed after the steering control began, the program proceeds to Steps 208 and 209, where the recovering state of the grip factor is determined. That is, if it is determined at Step 208 that the present grip factor ε(n) is equal to or larger than an intermediate value [(εmin+a)/2] between the minimal value εmin and the predetermined value (a) when the steering control began, and if it is determined at Step 209 that the present grip factor ε(n) is larger than the grip factor ε(n−1) obtained at the previous cycle (or a few cycles prior to the present cycle), it is determined that the grip factor tends to be recovered, so that the program returns to the main routine as shown in FIG. 6. On the contrary, if it is determined that the grip factor does not tend to be recovered, the program proceeds to Step 210 and Steps to be followed, where the decelerating control is performed.

At Step 210, the desired deceleration is set on the basis of the present grip factor ε(n) as shown in a map of FIG. 9. In the case where the steering control is operative, when the grip factor comes to be smaller than a predetermined value (c), the desired deceleration is set as indicated by the solid line. On the contrary, in the case where the steering control is inoperative, when the grip factor comes to be smaller than a predetermined value (d) which is larger than the predetermined value (c), the desired deceleration is set as indicated by the broken line. Although the map provided for the case where the steering control is operative is different from the map provided for the case where the steering control is inoperative according to the present embodiment, those maps may be identical, and any value may be set as each predetermined value. Consequently, the program proceeds to Step 211, where the braking force (controlled amount) for each wheel can be provided to obtain the desired deceleration calculated at Step 210.

Figure 10:
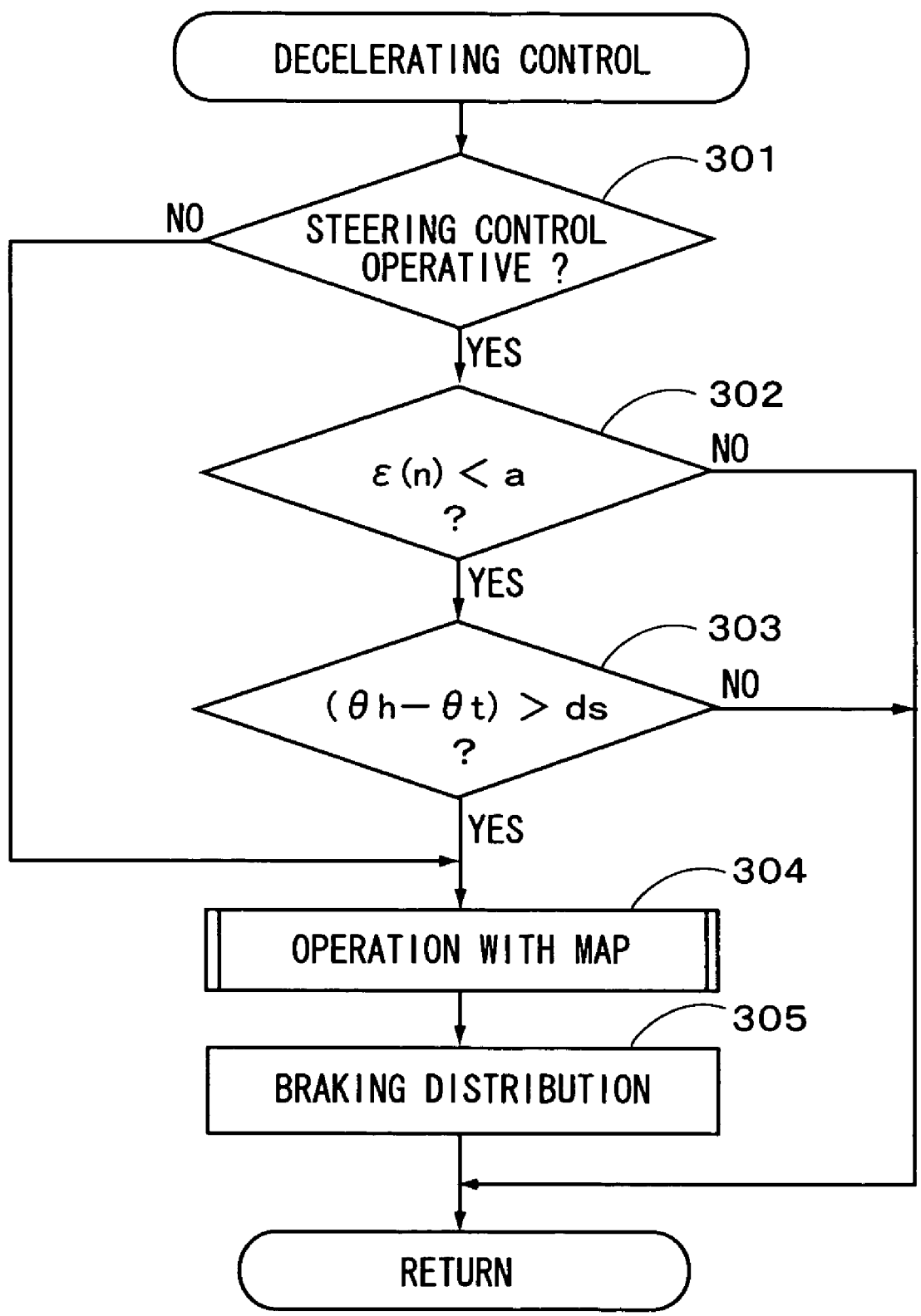
FIG. 10 is a flowchart showing operation of a decelerating control to be performed in response to a grip factor according to a further embodiment of the present invention.

FIG. 10 discloses a further embodiment of the decelerating control to be performed according to the grip factor at Step 115 as shown in FIG. 6, wherein the steering control to be performed is the same as the one as shown in FIG. 5. At Step 301, it is determined whether the steering control can be performed or not, on the basis of the information (B) transmitted by the steering control unit ECUL. If the steering control is operative, the program proceeds to Step 302, otherwise the program proceeds to Step 304, where the decelerating control is performed according to the grip factor as shown in FIG. 9. In the case where it is determined at Step 302 that the present grip factor ε(n) is equal to or larger than the predetermined value (a), and where the steering control has not been performed, the program returns to the main routine as shown in FIG. 6. In the case where it is determined at Step 302 that the present grip factor ε(n) is smaller than the predetermined value (a), the program proceeds to Step 303 where a difference between the steering angle and tire angle (θh−θt) is compared with a predetermined value (ds) which provides the second threshold value. As a result, if the difference (θh−θt) is equal to or smaller than the predetermined value (ds), the program returns to the main routine as shown in FIG. 6. On the contrary, if the difference (θh−θt) is larger than the predetermined value (ds), the program proceeds to Step 304 where the decelerating control is performed. The tire angle has been controlled to be smaller than the steering angle through the steering control operation. Therefore, the difference will be enlarged to exceed the predetermined value (ds), provided that the vehicle driver further operates the steering wheel during the control of variable steering gear ratio. At Step 304, the desired deceleration is set as shown in the map of FIG. 9, and the same operation as the aforementioned operation at Step 210 in FIG. 8 is performed. Consequently, the program proceeds to Step 305, where the braking force (controlled amount) for each wheel is provided to obtain the desired deceleration calculated at Step 304.

As for the steering control to be performed together with the embodiments of the decelerating control performed according to the grip factor as described above, the control of variable steering gear ratio as shown in Step 104 in FIG. 5 has been selected. However, the steering control is not necessarily limited to the one for enabling the steering angle ratio (gear ratio) to be varied, but may be the one for enabling any tire angle to be provided. Also, as for the decelerating control, the braking control has been selected. However, the decelerating control may be the one for controlling the shift control to shift down the gear ratio of the shift control device GS, thereby to decrease the vehicle speed, or engine controls such as the one for controlling the throttle opening, the one with a so-called fuel-cut or the like, thereby to decrease the vehicle speed.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control apparatus for performing a vehicle stability control on the basis of a parameter indicative of lateral margin for a tire on a road, comprising:
   steering control means for controlling a relationship between a steering angle and a tire angle to be varied;
   decelerating control means for controlling a vehicle speed to be decreased;
   monitor means for monitoring the parameter indicative of lateral margin for the tire; and
   motion control means for controlling said steering control means and said decelerating control means on the basis of the parameter monitored by said monitor means, said motion control means controlling said steering control means to decrease the tire angle relative to the steering angle, when the parameter is decreased from a value of relatively large lateral margin to a value of relatively small lateral margin, which is smaller than a first threshold value, and said motion control means controlling said decelerating control means to decrease the vehicle speed in addition to the steering control by said steering control means, when the parameter is further decreased to a value of lateral margin smaller than a second threshold value, which is smaller than the first threshold value.

2. A vehicle motion control apparatus as set forth in claim 1, further comprising steering monitor means for monitoring an operating state of said steering control means, wherein said motion control means modifies the second threshold value to be larger in margin, when it is determined on the basis of the result monitored by said steering monitor means that said steering control means is inoperative.

3. A vehicle motion control apparatus as set forth in claim 1, wherein said motion control means controls said decelerating control means to decrease the vehicle speed, in the case where the parameter indicative of lateral margin for the tire does not tend to be recovered, when a predetermined time has elapsed after said motion control means controlled said steering control means to decrease the tire angle relative to the steering angle, whereby it is determined that the parameter has come to be decreased to a value of lateral margin smaller than the second threshold value.

4. A vehicle motion control apparatus as set forth in claim 3, further comprising steering monitor means for monitoring an operating state of said steering control means, wherein said motion control means controls said decelerating control means to decrease the vehicle speed, in the case where it is determined on the basis of the result monitored by said steering monitor means that said steering control means is inoperative, when the parameter has come to be decreased from a value of lateral margin larger than a third threshold value, which is larger than the second threshold value, to a value of lateral margin smaller than the third threshold value.

5. A vehicle motion control apparatus as set forth in claim 4, wherein the third threshold value is set to be equal to the first threshold value.

6. A vehicle motion control apparatus as set forth in claim 1, wherein said motion control means controls said decelerating control means to decrease the vehicle speed, in the case where the relationship between the steering angle and the tire angle has provided a difference larger than a predetermined difference, after said motion control means controlled said steering control means to decrease the tire angle relative to the steering angle, whereby it is determined that the parameter has come to be decreased to a value of lateral margin smaller than the second threshold value.

7. A vehicle motion control apparatus as set forth in claim 6, further comprising steering monitor means for monitoring an operating state of said steering control means, wherein said motion control means controls said decelerating control means to decrease the vehicle speed, in the case where it is determined on the basis of the result monitored by said steering monitor means that said steering control means is inoperative, when the parameter has come to be decreased from a value of lateral margin larger than a fourth threshold value, which is larger than the second threshold value, to a value of lateral margin smaller than the fourth threshold value.

8. A vehicle motion control apparatus as set forth in claim 7, wherein the third threshold value is set to be equal to the first threshold value.

9. A vehicle motion control apparatus as set forth in claim 1, wherein said decelerating control means includes at least one of braking control means for controlling braking force applied to said tire, control means for controlling an engine output, and means for controlling a shift gear ratio.

* * * * *